Oct. 22, 1940.  W. H. RUPP ET AL  2,218,993
BUBBLE CAP
Filed Dec. 24, 1937   2 Sheets-Sheet 1

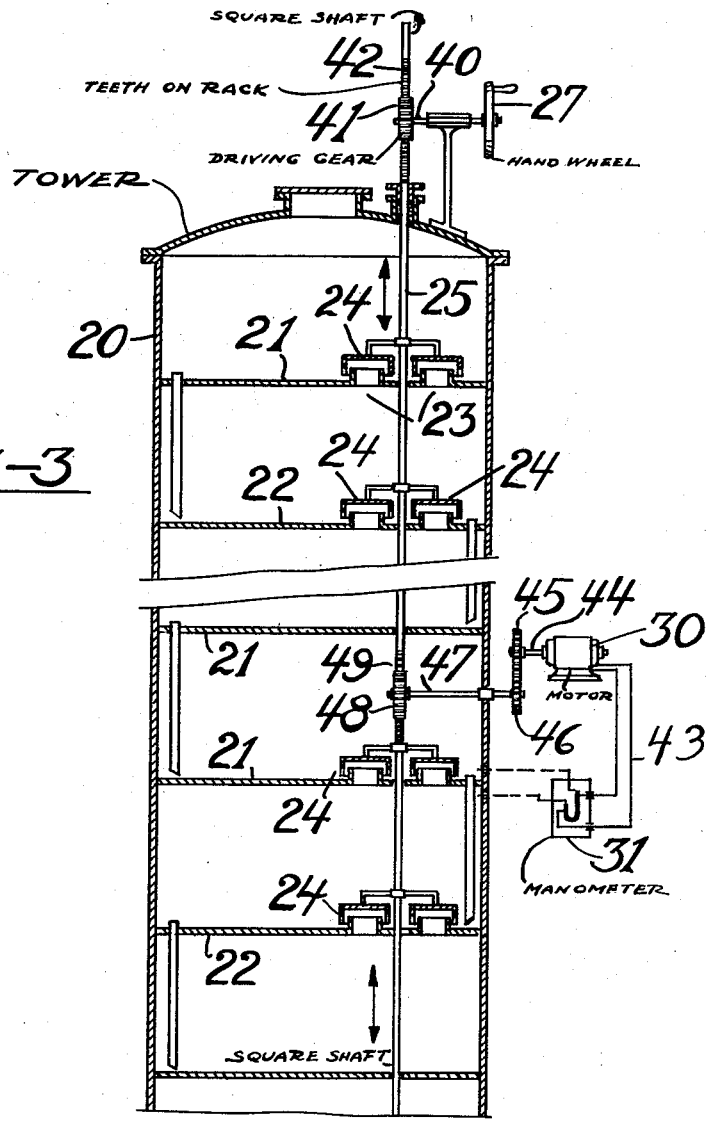

Patented Oct. 22, 1940

2,218,993

UNITED STATES PATENT OFFICE 2,218,993

BUBBLE CAP

Walter H. Rupp, Elizabeth, George L. Mateer, Roselle, and Thomas W. Moore, East Orange, N. J., assignors to Standard Oil Development Company, a corporation of Delaware Application December 24, 1937, Serial No. 181,716

2 Claims. (Cl. 261—114)

An object of the present invention is to provide means for maintaining an optimum velocity of the upflowing gases and vapors in a distilling or fractionating tower. It particularly relates to the method and apparatus of adjusting the slot area of a bellcap or other similar means to maintain the optimum pressure drop across the slots thereby maintaining substantially fixed optimum velocity of vapors or gases through the slots of the bellcaps.

The method of distilling and fractionating gases and vapors by passing them upwardly through a tower containing plates, bellcaps and means for maintaining a liquid level on the plates or trays is well known. This operation is conducted in an apparatus known as a bubble cap tower. These towers contain plates or trays having a few inches of liquid on each tray. Any excess liquid which may be added drains through an overflow to the plate below and if all plates are up to the maximum level, the liquid will drain from plate to plate to the bottom of the tower. Vapors rise through spouts with which the plate is studded into the space inside the bellcaps covering the spouts, and then by bubbling through slots in the lower edge of the bells, flow into the vapor space above the plate. Thus vapors flowing into the tower are brought into intimate contact with the liquid on each plate as they bubble through it. Separation of liquid and vapors occurs by fractional condensation. This is effected by passing these vapors upwardly through the tower and contacting the vapors with downwardly flowing liquid reflux on the multiplicity of levels secured by means of the bubble trays.

These methods of contacting upflowing vapors with the respective liquid levels on the plates by passing said vapors through slots in the bellcap have the inherent disadvantage that the slot area must be designed for a fixed predetermined feed rate. This is necessary in order to secure the optimum velocity for given feed conditions and in order to secure maximum plate efficiency. The preferred conditions are to have relatively small bubbles in contact for a maximum time with the liquid through which it flows on the respective plates. If the quantity of gas flowing through the tower is increased above the designed rate, the velocity through the respective slots increases, resulting in large bubbles which flow rapidly through the liquid level, considerably cutting down the time of contact. This condition, when aggravated, results in the gases blowing through the slots which causes excessive frothing and foaming on the plates and causes the up-flowing gases to contain excessive entrained liquid and at some time causes liquid to be blown out of the top of the tower. This, of course, greatly decreases the plate efficiency and the overall efficiency of the equipment resulting in inferior fractionation and products. On the other hand, if the quantity passed through the tower is below the designed rate, it results in a relatively non-uniform and pulsating flow through the slots which also greatly decreases the plate efficiency and the overally efficiency of the tower.

The present invention secures the optimum velocity by definitely adjusting the free slot area for the particular feed rate being used thereby securing the optimum pressure drop across the slots. By free slot area is meant the slot area which is not covered by the cap or hood section. Thus for a fixed rate of vapor flow the maximum contacting efficiency between the vapor and the liquid is secured and the full benefit of the bubble plate is realized. In the preferred modification of this invention, the optimum contacting velocity is secured by a bellcap adjustment which is complete within itself and which is motivated by the upflowing vapor acting on the cap part of the bellcap. This cap is a floating type cap motivated by the pressure of the upflowing gases and is designed to assume a position in respect to the fixed slotted section dependent upon the quantity of the upflowing vapors. Other modifications may be employed as, for example, the adjustment may also be secured by varying the bellcap assembly by external means. The bellcap is adjusted to maintain substantially a constant differential pressure across the slot orifice, which constant differential pressure will in turn maintain the constant optimum contacting velocity desired. At this optimum contacting velocity, the fractionating efficiency of the plate is automatically adjusted to secure this maximum plate efficiency for varying rates of vapor flow.

Figure 3 illustrates diagrammatically a fragment of a bubble tower in which the caps may be raised or lowered by means of a hand wheel.

Figure 4 illustrates diagrammatically automatic mechanism for raising or lowering the caps in the bubble tower.

Figure 2:
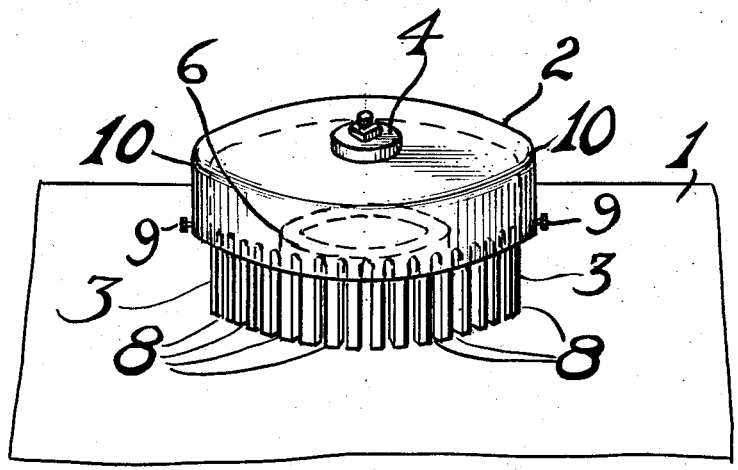
Figure 2 is a perspective view showing the relative position of a cap movable in response to gas pressure beneath said cap.
Figure 1:
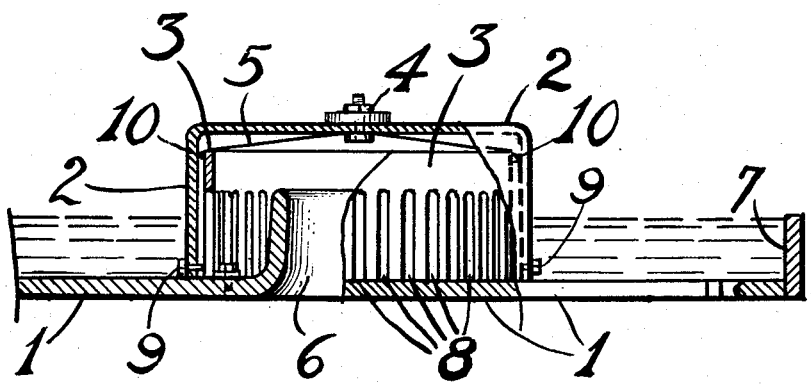
Figure 1 is a vertical section taken through a plate disposed within a bubble tower.

Referring in detail to Figs. 1 to 4, the invention illustrated comprises a tower and means for securing optimum contacting velocity for varied rates of vapor fed to the tower to be fractionated. The tower may contain any number of plates and the respective plates may contain any suitable number of bells of similar construction. This plate contains a sealing lip 6 around which is fitted a stationary slotted section 3 which contains slots 8 through which the vapor flows and contacts the liquid on the plate, which is maintained at a fixed liquid level by means of overflow weir 7. The stationary slotted section 3 is bolted or attached permanently by other means to plate 1. Over the stationary section 3 is a movable section 2 containing no slots. This section consists merely of a blank cap-shaped cover against which the vapor rising through the plate exerts pressure. The construction of this movable section 2 is such that it will change its position vertically with an increase or decrease of pressure on its bottom section. Thus when the pressure is increased on the underside of 2, the cap will rise and the free slot area of 3 will be increased. In this manner, a constant differential pressure is maintained across the slots of the stationary section 3. The weight of section 2 is adjusted so that the differential pressure will maintain a constant optimum contacting velocity between the upflowing vapors and the liquid on the plate. Set screws 9 guide the movable cap 2 and may be fitted to slide in a recess on stationary cap 3. These set screws when screwed in will prevent the movable cap 2 from disengaging from the stationary cap 3 by locking with stops 10 attached to the upper part of stationary section 3.

The movable section 2 may be attached to the fixed section 3 by means of a spring 5, which will help to improve the operation of the cap. A counter weight 4 may also be supplied, which will also help to adjust the operation. These refinements are not necessary but may be useful in certain operations for overcoming or adjusting the energy of the movable section. It is preferable, of course, to have the weight of the cap 2 sufficient to secure the optimum velocity across the slots. The caps, therefore, are preferably made of highly non-corrosive sheet metal or other similar material.

Figure 2 shows the relative position of the movable cap with respect to the fixed cap 3 in which the free slot area, in order to secure the optimum velocity, is equal to the area of the slots exposed between the bottom of movable cap 2 and the plate 1. The vapors flow upwardly through and over lip 6, exerting a pressure on the underside of cap 2 and flow downwardly and out through slots 8.

Figure 3 illustrates another embodiment of the invention. In this figure, 20 represents a section of a bubble cap tray fractionating tower. Trays 21 and 22 in this tower contain bubble caps represented by 23 containing slots in the outer section through which the upflowing gases pass. The free area of these slots may be varied by being covered with a bubble cap cover 24 which may be motivated in the manner shown by the bubble cap cover separating rod 25. The hand wheel 27 is mounted on shaft 40 upon which is also mounted driving gear 41. Driving gear 41 engages the teeth of rack 42 formed on rod 25 which preferably is square or rectangular in cross section. It is obvious that by rotating the hand wheel 27, the rod 25 may be raised or lowered and with it the caps on plates 21 and 22.

Figure 4 shows one method of varying the bubble cap separating rod in a mechanical manner by means of motor 30. The motor is controlled by a pressure differential means as, for example, a manometer 31 which measures the pressure differential across the bell. The pressure differential when too high beneath the caps on plate 21 causes an electric impulse to be transmitted through line 43, causing, in turn, the starting of motor 30, which carries on a projection 44 of its shaft, a tightly mounted gear 45 which engages gear 46 integral on shaft 47, on which shaft also is securely mounted driving gear 48, engaging rack 49, thus causing the rod 25 to be raised or lowered, responsive to the pressure beneath the cap 24.

Other means may be utilized to secure the optimum slot velocity in accordance with the disclosures of this invention. For example, the movable cap may also contain slots which, when fully opened, are entirely flushed with the slots of the fixed caps and may be rotated so as to partially cut off the opening of the fixed cap.

The invention is not to be limited by any theory or method as to its operation but only by the following claims in which it is desired to claim all novelty in so far as the prior art permits.

We claim:

1. A bubble cap assembly comprising a slotted cylindrical-like section designed to be rigidly attached, an overlapping concentric cap section adapted to move along the axis of the slotted section, said cap section being a floating cap adapted to be motivated by upflowing vapors and to assume a position in respect to the slotted section dependent upon the quantity of the upflowing vapors.

2. An improved bellcap assembly for a bubble cap-tray tower designed to maintain substantially the fixed velocity of the vapors passing through the caps irrespective of the quantity of vapors comprising a fixed slotted section attached rigidly to the tray, a concentric overlapping floating movable cap section designed to move vertically along the axis of the fixed section and adapted to be motivated by the pressure of the upflowing gases and to assume a position in respect to the fixed section dependent upon the quantity of the upflowing vapors

GEORGE L. MATEER.
WALTER H. RUPP.
THOMAS W. MOORE.